US 6,690,412 B1

(12) United States Patent
Higo

(10) Patent No.: US 6,690,412 B1
(45) Date of Patent: Feb. 10, 2004

(54) REMOTE CONTROL PAN HEAD SYSTEM

(75) Inventor: Akira Higo, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/525,899

(22) Filed: Mar. 15, 2000

(30) Foreign Application Priority Data

Mar. 15, 1999 (JP) .......................................... 11-068689

(51) Int. Cl.[7] ................................................ H04N 7/18
(52) U.S. Cl. ................................. 348/143; 348/211.99
(58) Field of Search ............................... 348/143, 152, 348/211.99, 155, 211.7, 211.13

(56) References Cited

U.S. PATENT DOCUMENTS

| | | | | |
|---|---|---|---|---|
| 5,134,472 A | * | 7/1992 | Abe ............................ | 348/155 |
| 5,521,634 A | * | 5/1996 | McGary ...................... | 348/143 |
| 5,526,041 A | * | 6/1996 | Glatt .......................... | 348/143 |
| 5,847,755 A | * | 12/1998 | Wixson et al. ............... | 348/155 |
| 5,929,904 A | * | 7/1999 | Uchida ................... | 348/211.99 |
| 6,104,831 A | * | 8/2000 | Ruland ....................... | 348/155 |
| 6,297,846 B1 | * | 10/2001 | Edanami ..................... | 348/155 |
| 6,421,081 B1 | * | 7/2002 | Markus ...................... | 348/143 |
| 6,469,732 B1 | * | 10/2002 | Chang et al. ............. | 348/14.08 |

* cited by examiner

*Primary Examiner*—Wendy R. Garber
*Assistant Examiner*—Rashawn N. Tillery
(74) *Attorney, Agent, or Firm*—Birch, Stewart, Kolasch & Birch, LLP

(57) ABSTRACT

If a remote control pan head on which a TV camera is mounted is installed on the rooftop of a building for example, the TV camera shoots an image in which a part of the building appears. If an operator designates a point on the outline of the building within the image shot by the camera, an image processing apparatus can automatically determine the outline continuing from the designated point. Then, a shooting range restricting device controls the pan head to restrict changeable ranges of a shooting direction and a shooting angle of view of the camera according to the determined outline of the building so that the shot image can be prevented from being spoiled by the building.

2 Claims, 5 Drawing Sheets

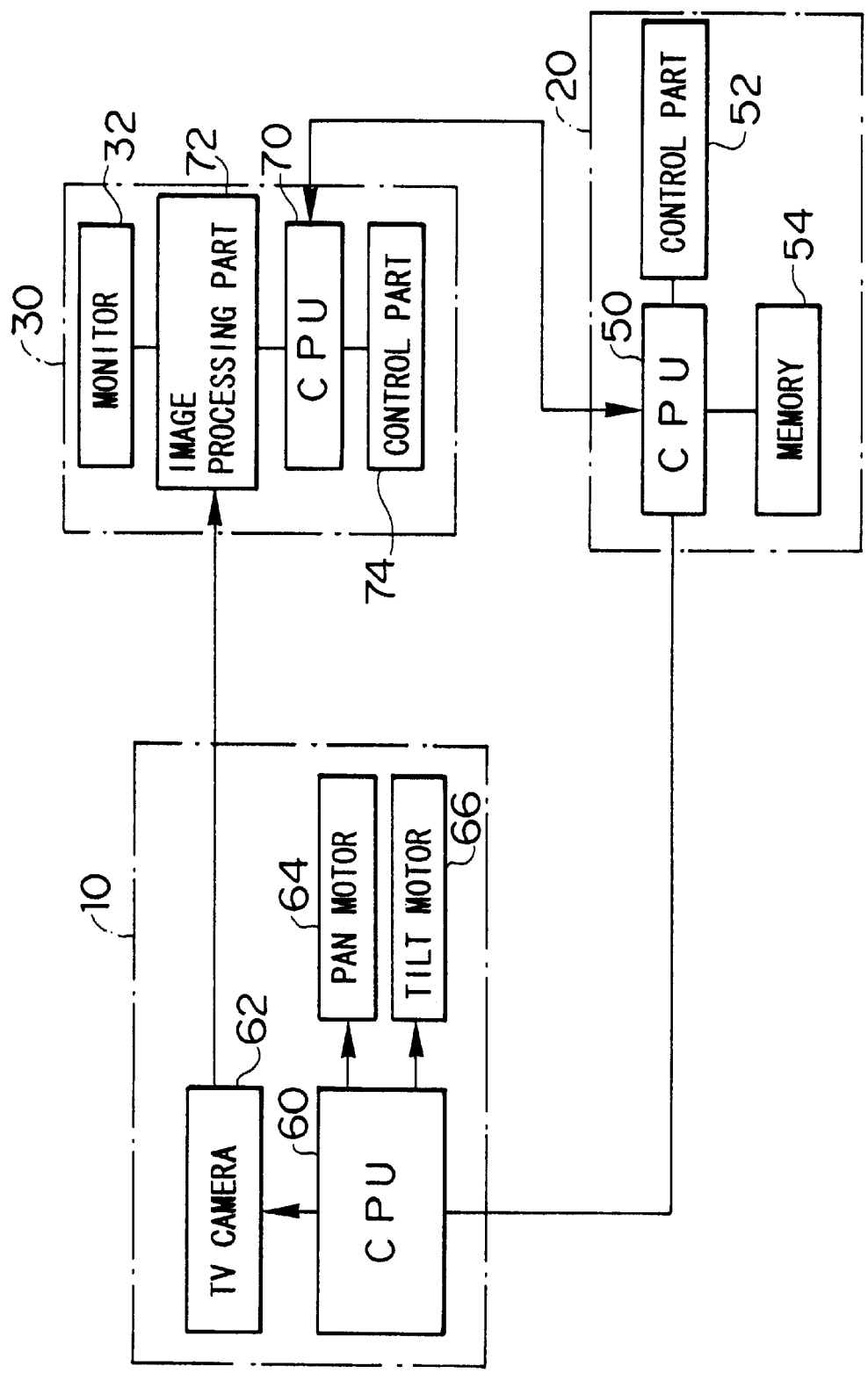
F I G. 2

REMOTE CONTROL PAN HEAD SYSTEM

BACKGROUND OF THE INVENTION

1. Field of the Invention

This invention relates generally to a remote control pan head system, more particularly to a remote control pan head system that controls a shooting direction and a shooting angle of view of a camera mounted on a pan head by a controller.

2. Description of Related Art

In a remote control pan head system, a pan head controller transmits control signals to a remote control pan head on which a TV camera (hereinafter referred to as a camera) is mounted, and the remote control pan head pans and tilts the camera to control a shooting direction of the camera and makes a taking lens in the camera perform operations such as zooming to control a shooting angle of view and the like of the camera.

The remote control pan head system is usually used to shoot outside by the camera installed outdoors, e.g., on the rooftop of a building. In the case where the remote control pan head is installed on the rooftop of the building, if the remote control pan head tilts the camera downward to shoot something on the ground, a part (e.g., a corner part) of the rooftop of the building may largely appear in the image shot by the camera and a poor image is thereby shot and broadcast or recorded. This problem may occur if one or more of obstructive objects exist near the camera due to a place where the remote control pan head is installed. Likewise, the problem may also occur when the zooming position (the shooting angle of view) of the camera is switched from a telephoto side to a wide-angle side.

When an operator remotely controls the remote control pan head with the pan head controller, the operator has to control the shooting direction and the zooming of the camera with reference to only the image that is being shot by the camera. Hence, after an undesirable object has already spoiled the shot image, the operator becomes aware the problem and avoids it in many cases. It is thus difficult to avoid the spoiled image in advance even if the operator is careful in operating the pan head.

SUMMARY OF THE INVENTION

It is therefore an object of the present invention to provide a remote control pan head system that appropriately restricts ranges of the shooting direction and the angle of view of a camera mounted on a remote control pan head to surely prevent an undesirable object from being shot, and that automatically determines the undesirable object in a simple designating operation to thereby easily set the changeable ranges of the shooting direction and the shooting angle of view of the camera.

The above object can be accomplished by providing a remote control pan head system, comprising: a pan head on which a camera is mounted, the pan head controlling a shooting direction and a shooting angle of view of the camera; a controller which controls the pan head; an outline determining device which determines a position of an outline of a shooting-avoided object by processing an image shot by the camera; and a shooting-range restricting device which controls the pan head to restrict ranges of the shooting direction and the shooting angle of view of the camera according to the position of the outline of the shooting-avoided object determined by the outline determining device.

According to the present invention, the outline position of the shooting-avoided object is determined in advance, and the ranges wherein the shooting direction and the shooting angle of view of the camera can be changed by the controller are restricted according to the determined outline position. This surely prevents the shot image from being spoiled by the shooting-avoided object even if an operator pays no attention to the shooting-avoided object.

The outline determining device preferably comprises: a designating device which designates a detection starting point to determine the outline of the shooting-avoided object on an image, shot by the camera, in which at least a part of the outline of the shooting-avoided object appears; and an image processing device which continuously changes the shooting direction and the shooting angle of view of the camera to determine the position of the outline of the shooting-avoided object continuing from the detection starting point designated by the designating device in an image processing.

According to the present invention, it is possible to automatically determine the outline of the shooting-avoided object in the image processing by designating one point on the outline of the shooting-avoided object on the image. This makes it easier to designate the ranges wherein the shooting direction and the shooting angle of view are changeable.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a block diagram showing the structure of the remote control pan head system;

DETAILED DESCRIPTION OF THE PREFERRED EMBODIMENT

This invention will be described in further detail by way of example with reference to the accompanying drawings.

Figure 1:
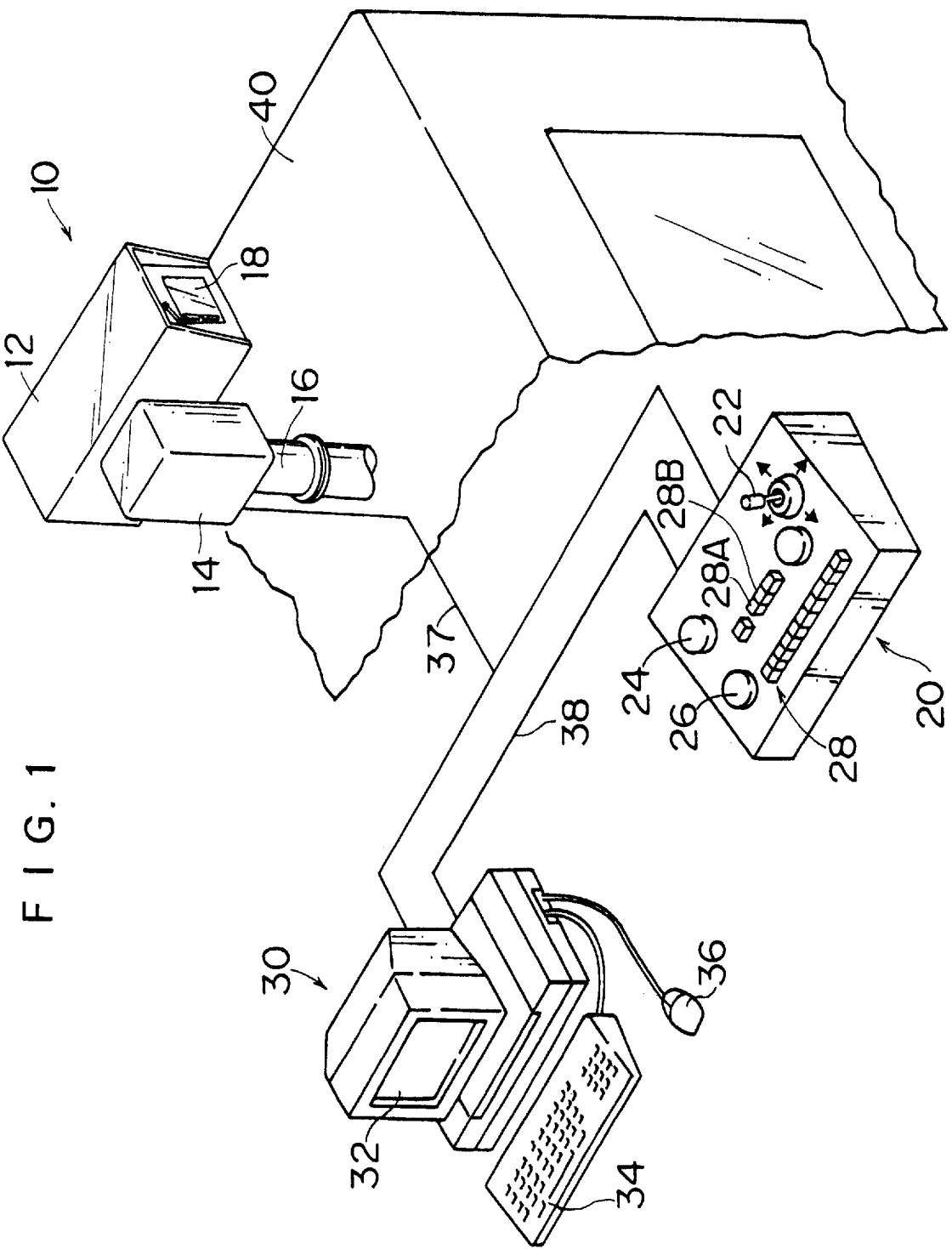
FIG. 1 is a schematic diagram showing a remote control pan head system according to an embodiment of the present invention.

FIG. 1 is a schematic diagram showing a remote control pan head system according to an embodiment of the present invention. In FIG. 1, reference numeral 10 is a remote control pan head; 20 is a pan head controller; and 30 is an image processing apparatus (e.g., a personal computer). The pan head controller 20 and the image processing apparatus 30 connect to the remote control pan head 10 through a communication line (e.g., a telephone line) 37. The pan head controller 20 and the image processing apparatus 30 are connected through, for example, a serial communication cable 38. In the present embodiment, the remote control pan head 10 is installed on the rooftop of a building 40.

The remote control pan head 10 comprises a housing 12 and a pan head body 14 supporting the housing 12. The housing 12 contains a TV camera (hereinafter referred to as a camera) 62 (see FIG. 2). A window 18 is provided at the front of the housing 12 so that the camera in the housing 12 can shoot an image of the outside.

One side of the housing 12 is supported by a tilt shaft extending from the pan head body 14, and the tilt shaft is rotated by a tilt motor 66 (see FIG. 2) built in the pan head body 14. Running the tilt motor 66 causes the camera 62 to tilt vertically. The pan head body 14 is supported on a pan shaft 16 fixed on an installation platform (not illustrated) on the rooftop of the building 40. The pan shaft 16 is rotated, with respect to the pan head body 14, by a pan motor 64 (see FIG. 2) built in the pan head body 14. Running the pan motor 64 causes the camera 62 to pan horizontally.

The pan head controller 20 is used to remotely control the remote control pan head 10 and the camera 62. As is well known, a joystick 22 for designating a panning and tilting angles of the remote control pan head 10, a focus dial 24 for designating a focusing position of the camera 62, a zoom dial 26 for designating a zooming position of the camera 62 and a button group 28 for designating other items are arranged on the pan head controller 20. As described later in further detail, the button group 28 includes a restriction data producing button 28A and a restriction mode button 28B. The restriction data producing button 28A and the restriction data button 28B are used to restrict the shooting direction and the shooting angle of view of the camera 62 in order to prevent one or more of shooting-avoided objects such as of the building 40 from largely appearing in an image shot by the camera 62.

The image processing apparatus 30 obtains a video signal from the camera 62 when the restriction data producing button 28A of the pan head controller 20 is turned on. The image processing apparatus 30 determines an outline of the shooting-avoided object from the video signal by processing the obtained image to thereby automatically produce restriction data. The image processing apparatus 30 is a personal computer or the like, which has a monitor 32, a keyboard 34 and a mouse 36.

FIG. 2 is a block diagram showing the structure of the remote control pan head system. As shown in FIG. 2, the pan head controller 20 includes a CPU 50 detecting the operation of a control part 52, which comprises the joystick 22, the focus dial 24, the zoom dial 26 and the button group 28 (see FIG. 1). The CPU 50 transmits a variety of commands according to the operation of the control part 52 to the remote control pan head 10 through the communication line 37. For example, if the joystick 22 is operated horizontally, the CPU 50 successively updates the panning position at a speed corresponding to a tilting angle of the joystick 22, and transmits a panning command to the remote control pan head 10 in order to instruct the remote control pan head 10 to move to the updated panning position. Similarly, if the joystick 22 is operated vertically, the CPU 50 successively updates the tilting position at a speed corresponding to a tilting angle of the joystick 22, and transmits a tilting command to the remote control pan head 10 in order to instruct the remote control pan head 10 to move to the updated tilting position. If the zoom dial 26 is operated, the CPU 50 transmits a zooming command to the remote control pan head 10 in order to instruct the remote control pan head 10 to zoom the camera 62 corresponding to a dial position of the zoom dial 26.

When the restriction mode button 28B of the control part 52 is turned on, the CPU 50 restricts the ranges of the panning position, the tilting position and the zooming position of the camera 62 that can be controlled by the joystick 22 and the zoom dial 26 of the control part 52, in other words, the shooting direction and the shooting angle of view of the camera 62, on the basis of the restriction data recorded in a memory 54.

The restriction data is used to beforehand restrict a shooting range (the ranges of the panning position, the tilting position and the zooming position) that can be controlled by the control part 52 (the joystick 22 and the zoom dial 26) of the pan head controller 20 in order to prevent the shooting-avoided object such as the rooftop of the building 40 from largely appearing in the image shot by the camera 62. As described later in further detail, the image processing apparatus 30 can easily produce the restriction data by turning on the restriction data producing button 28A of the pan head controller 20. The procedure for producing the restriction data will be described later.

The remote control pan head 10 has a CPU 60, which exchanges signals with the CPU 50 of the pan head controller 20 through the communication line 37. The CPU 60 receives a variety of commands from the CPU 50 of the pan head controller 20, and controls the pan motor 64, the tilt motor 66 and the camera 62. When the CPU 60 receives the panning command, it runs the pan motor 64 and moves the camera 62 to the designated panning position. When the CPU 60 receives the tilting command, it runs the tilt motor 64 and moves the camera 62 to the designated tilting position. When the CPU 60 receives the zooming command, it outputs a control signal to the camera 62 and moves the zoom lens to the designated zooming position.

The image processing apparatus 30 has a CPU 70, which exchanges signals with the CPU 50 of the pan head controller 20 through the serial communication cable. When the CPU 50 of the pan head controller 20 instructs the CPU 70 to produce the restriction data, the CPU 70 extracts the outline of the shooting-avoided object (an undesired object) from the video signal outputted from the camera 62 by the image processing performed by an image processing part 72, and determines the position of the outline. The shooting-avoided object is designated in such a manner that an operator designates a part of the outline of the shooting-avoided object with the keyboard 34, the mouse 36 or the like with reference to an image shot by the camera 62, which is displayed on the monitor 32. The image processing part 72 extracts an entire outline image existing continuously with respect to the outline image at a position designated by the operator in the image processing to thereby determine the position of the entire outline of the shooting-avoided object in the image shot by the camera 62.

When the restriction data producing button 28A is turned on, the CPU 50 of the pan head controller 20 enters a restriction data producing mode and instructs the image processing apparatus 30 to produce the restriction data as mentioned above. At the same time, the CPU 50 gradually changes the panning position, the tilting position and the zooming position within the changeable ranges, and obtains the outline position of the shooting-avoided object in the image shot in each shooting direction and shooting angle of view from the image processing apparatus 30. The image processing apparatus 30 can determine the outline position of the shooting-avoided object in each shooting direction and shooting angle of view of the camera 62 with reference to the outline position, which has already been determined with respect to another shooting direction and shooting angle of view. For this reason, the operator has to designate the outline of the shooting-avoided object only once on an initial picture.

Then, the CPU 50 of the pan head controller 20 finds thresholds of the panning position, the tilting position and the zooming position according to the outline position of the shooting-avoided object acquired from the image processing apparatus 30. The thresholds determine a permissible limit for the shooting-avoided object to appear in the image shot by the camera 62, and are recorded as restriction data in the memory 54. The limit permitting the shooting-avoided object to appear in the image shot by the camera 62 can be arbitrarily designated by specifying a frame in a desired size on the monitor 32, or the range can be fixed. Alternatively, the thresholds may be set so as to entirely prevent the shooting-avoided object from appearing in the image shot by the camera 62.

Figure 3:
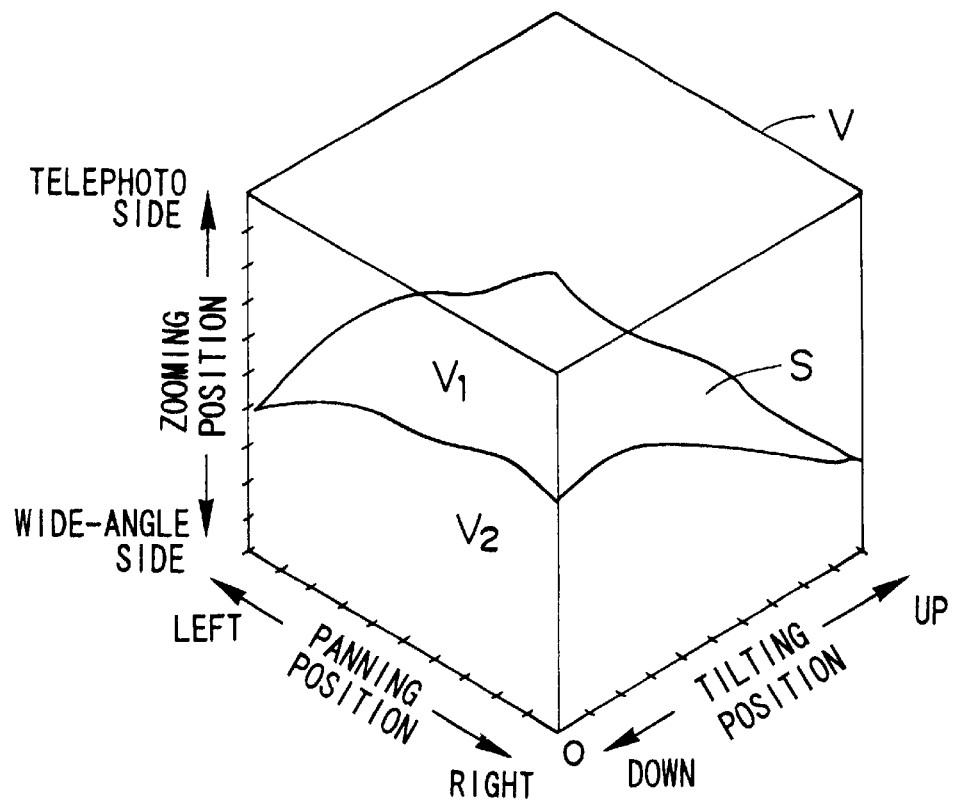
FIG. 3 is a view of assistance in explaining restriction data.

FIG. 3 shows the restriction data recorded in the memory 54. In FIG. 3, three perpendicular axes indicate the panning position, the tilting position and the zooming position, and the thresholds of the panning position, the tilting position and the zooming position permitting the shooting-avoided object to appear in the image shot by the camera 62, in other words, the restriction data is expressed by a threshold surface S. As shown in FIG. 3, the threshold surface S representing the restriction data vertically divides a rectangular space V representing the whole changeable ranges of the panning position, the tilting position and the zooming position into two spaces. In the upper space V1, the panning position, the tilting position and the zooming position of the camera 62 can be changed freely by operating the joystick 22 and the zoom dial 26 of the pan head controller 20. If at least one of the operations of the joystick 22 and the zoom dial 26 of the pan head controller 20 is going to cause at least one of the panning position, the tilting position and the zooming position of the camera 62 to reach the lower space V2, the CPU 50 of the pan head controller 20 restricts the command to the remote control pan head 10 in order to prevent the panning position, the zooming position and the tilting position of the camera 62 from being positioned in the lower space V2. The shape of the threshold surface S in FIG. 3 is only an example. Actually, the shape of the threshold surface S varies according to the outline shape of the shooting-avoided object. Where the changing operation is permitted in the space V divided by the threshold surface S is also different according to the position, the shape and the like of the shooting-avoided object. Thus, if a subject that is designated as the shooting-avoided object is restricted to the rooftop of the building 40 and the like, the shape of the threshold surface S can be estimated to some degree so that a space permitting the changing operation can be predetermined. If the shooting-avoided object is not particularly restricted, it is possible to provide a means for determining which part permits the changing operation in the space V divided by the threshold surface S.

Figure 4:
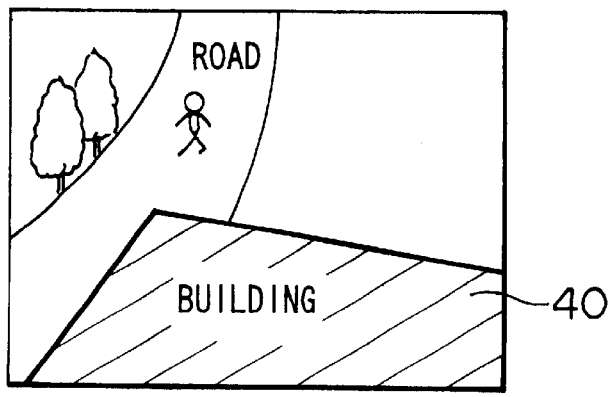
FIG. 4 is a view of assistance in explaining the procedure for producing restriction data.
Figure 5A:
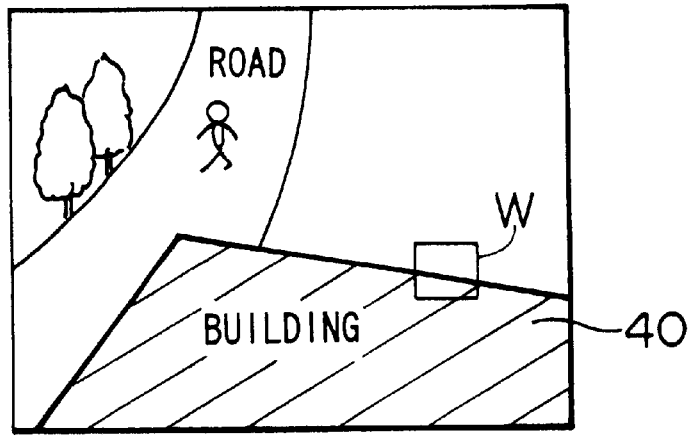
FIGS. 5(A) and 5(B) are views of assistance in explaining the procedure for producing restriction data.
Figure 5A:
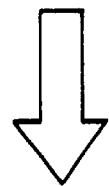

A description will now be given of the control data producing procedure in the case where the building 40 on which the remote control pan head 10 is installed is designated as the shooting-avoided object. To produce the restriction data, the operator adjusts the shooting direction and the shooting angle of view of the camera 62 by operating the joystick 22 and the zoom dial 26 of the pan head controller 20 in a normal mode (a mode in which the restriction mode button 28B is off) in such a manner that the outline of the building 40 is included in the shooting range as shown in FIG. 4. Then, the operator turns on the restriction data producing button 28A of the pan head controller 20. As shown in FIG. 5(A), a designation frame W for designating the outline of the shooting-avoided object included in the image shot by the camera 62 is thereby displayed on the monitor 32 of the image processing apparatus 30.

Figure 5B:
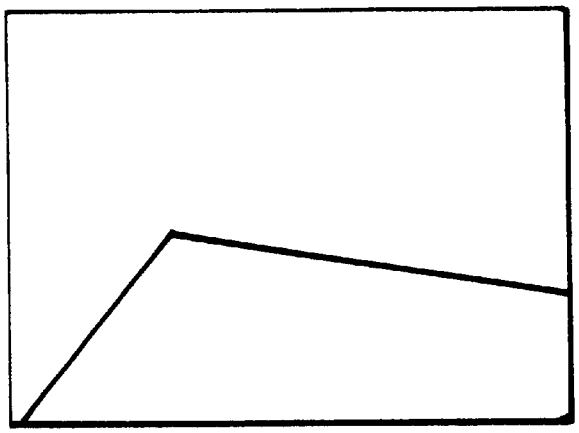

The operator moves the designation frame W to a desired position on the outline of the building 40 on the image displayed on the monitor 32 by operating the mouse 36, etc. of the image processing apparatus 30, and then sets the position of the designation frame W by clicking a button of the mouse 36 or the like. Consequently, the image processing part 72 of the image processing apparatus 30 determines the outline image of the building 40 within the designation frame W from the image at the position designated by the designation frame W, and determines the image of the whole outline continuing from the determined outline image in the image shot by the camera as shown in FIG. 5(B). Then, the image processing part 72 finds a position of the determined outline (more specifically, coordinates of points forming the outline on the monitor 32), and transmits the position to the pan head controller 20.

The CPU 50 of the pan head controller 20 instructs the image processing apparatus 30 to enter the restriction data producing mode as stated above, and obtains first data related to the outline position of the building 40 from the image processing apparatus 30. Then, the CPU 50 changes the panning position, the tilting position and the zooming position of the camera to produce the restriction data shown in FIG. 3.

Figure 6:
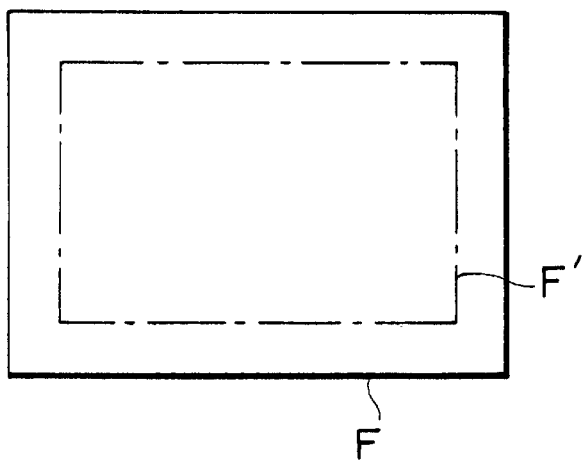
FIG. 6 is a view of assistance in explaining the procedure for producing restriction data.

Several methods can be considered to change the panning position, the tilting position and the zooming position of the camera. In one method, the panning position, the tilting position and the zooming position of the camera are changed in a predetermined order, and the panning position, the tilting position and the zooming position of the camera are sequentially designated at all the points (at regular intervals) in the space V indicating the entire changeable ranges in FIG. 3. At each point, the outline position of the building 40 is acquired from the image processing apparatus 30, and it is determined whether the outline position is within the permissible range of the shot image or not. The permissible range of the shot image is, for example, a range outside a permissible frame F' of a predetermined size, which is set in a frame F of the shot image as shown in FIG. 6. If the outline of the shooting-avoided object exists only in the permissible range, the designation of the panning position, the tilting position and the zooming position is permitted. The operator may arbitrarily change the size of the permissible frame F', or the size of the permissible frame F' may be fixed.

When it is determined whether the outline position of the building 40 acquired from the image processing apparatus 30 at each panning position, tilting position and zooming position of the camera is within the permissible range or not, the CPU 50 of the pan head controller 20 produces the restriction data forming the threshold surface S as shown in FIG. 3 by extracting threshold points of the permissible range. Since the threshold points thus acquired are discrete, the data between the threshold points may be interpolated by an interpolating process or the like.

In another method of producing the restriction data by changing the panning position, the tilting position and the zooming position of the camera, the restriction data is produced while following the positions of the threshold points. In this case, the operator designates the outline of the building as stated above, and the panning position and the tilting position at this time are fixed and the zooming position is gradually moved toward the wide-angle side or the telephoto side. At each zooming position, the outline position of the building 40 is acquired from the image processing apparatus 30. Then, it is determined whether the outline position is within the permissible range in the shot image or not to thereby determine the threshold points.

Then, the tilting position is changed slightly (e.g., by about 5°) with the panning position and the tilting position being fixed. Thereafter, the zooming position is gradually changed again toward the wide-angle side or the telephoto side to determine the threshold points as stated above. This procedure is repeated. After all the threshold points are determined for a certain panning position, the panning position is changed slightly (e.g., by about 5°) and the above procedure is repeated. Consequently, the restriction data in FIG. 3 is produced. Once the operator designates the outline of the building 40, the outline position of the building 40 required for finding the threshold points can be determined automatically as stated above.

Figure 7:
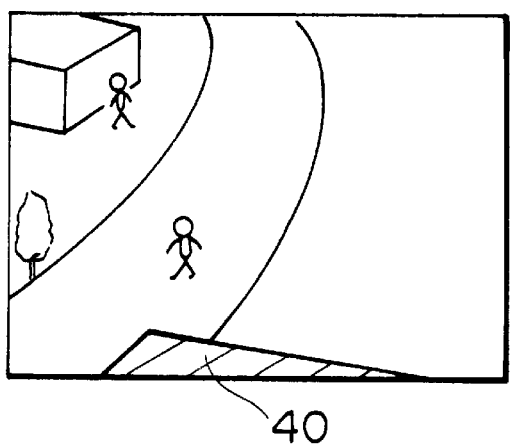
FIG. 7 is a view of assistance in explaining the operation in a restriction mode.

The produced restriction data is recorded in the memory 54 of the pan head controller 20. When the restriction mode button 28B of the pan head controller 20 is turned on, the ranges of the panning position, the tilting position and the zooming position of the camera that can be changed by operating the joystick 22 and the zoom dial of the pan head controller 20 are restricted according to the restriction data. If the tilting position is changed to tilt the camera downward by operating the joystick 22 of the pan head controller 20 at the same panning position and zooming position as the shot image in FIG. 4, the tilting position is prohibited from changing any more when a part of the building 40 slightly appears in the shot image as shown in FIG. 7. This surely prevents the building 40 as the shooting-avoided object from largely appearing in the shot image.

In the above-described embodiment, a personal computer or the like is used as the image processing apparatus 30, but the present invention should not be restricted to this. For example, the functions of the image processing apparatus 30 may be incorporated into the pan head controller 20.

In the above-described embodiment, the threshold points restricting the panning position, the tilting position, and the zooming position of the camera are produced as specific numerical values of the restriction data shown in FIG. 3. The present invention, however, should not be restricted to this. For example, it is possible to produce data on the outline position of the shooting-avoided object so that the panning position, the tilting position and the zooming position of the camera can be restricted by operation using the data on the outline position of the shooting-avoided object.

In the remote control pan head system according to the present invention as set forth hereinabove, the outline position of the shooting-avoided object is determined in advance, and the ranges of the shooting direction and the shooting angle of view of the camera that may be changed by the controller are restricted according to the determined outline position. This surely prevents the shooting-avoided object from spoiling the shot image even if the operator pays no attention to the shooting-avoided object.

In addition, it is possible to automatically determine the outline of the shooting-avoided object by the image processing only by designating a point of the outline of the shooting-avoided object on the image. Therefore, the ranges wherein the shooting direction and the shooting angle of view of the camera are changeable can easily be set.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A remote control pan head system, comprising:

a pan head on which a camera is mounted, the pan head controlling a shooting direction and a shooting angle of view of the camera;

a controller which controls the pan head;

an outline determining device which determines a position of an outline of a shooting-avoided object by processing an image shot by the camera; and a shooting-range restricting device which controls the pan head to restrict ranges of the shooting direction and the shooting angle of view of the camera according to the position of the outline of the shooting-avoided object determined by the outline determining device.

2. The remote control pan head system as defined in claim 1, wherein the outline determining device comprises:

a designating device which designates a detection starting point to determine the outline of the shooting-avoided object on an image, shot by the camera, in which at least a part of the outline of the shooting-avoided object appears; and an image processing device which continuously changes the shooting direction and the shooting angle of view of the camera to determine the position of the outline of the shooting-avoided object continuing from the detection starting point designated by the designating device in an image processing.

* * * * *